Feb. 17, 1953 R. H. GIVENS, JR., ET AL 2,628,679
TRAFFIC SIGNAL
Filed March 17, 1947 2 SHEETS—SHEET 1
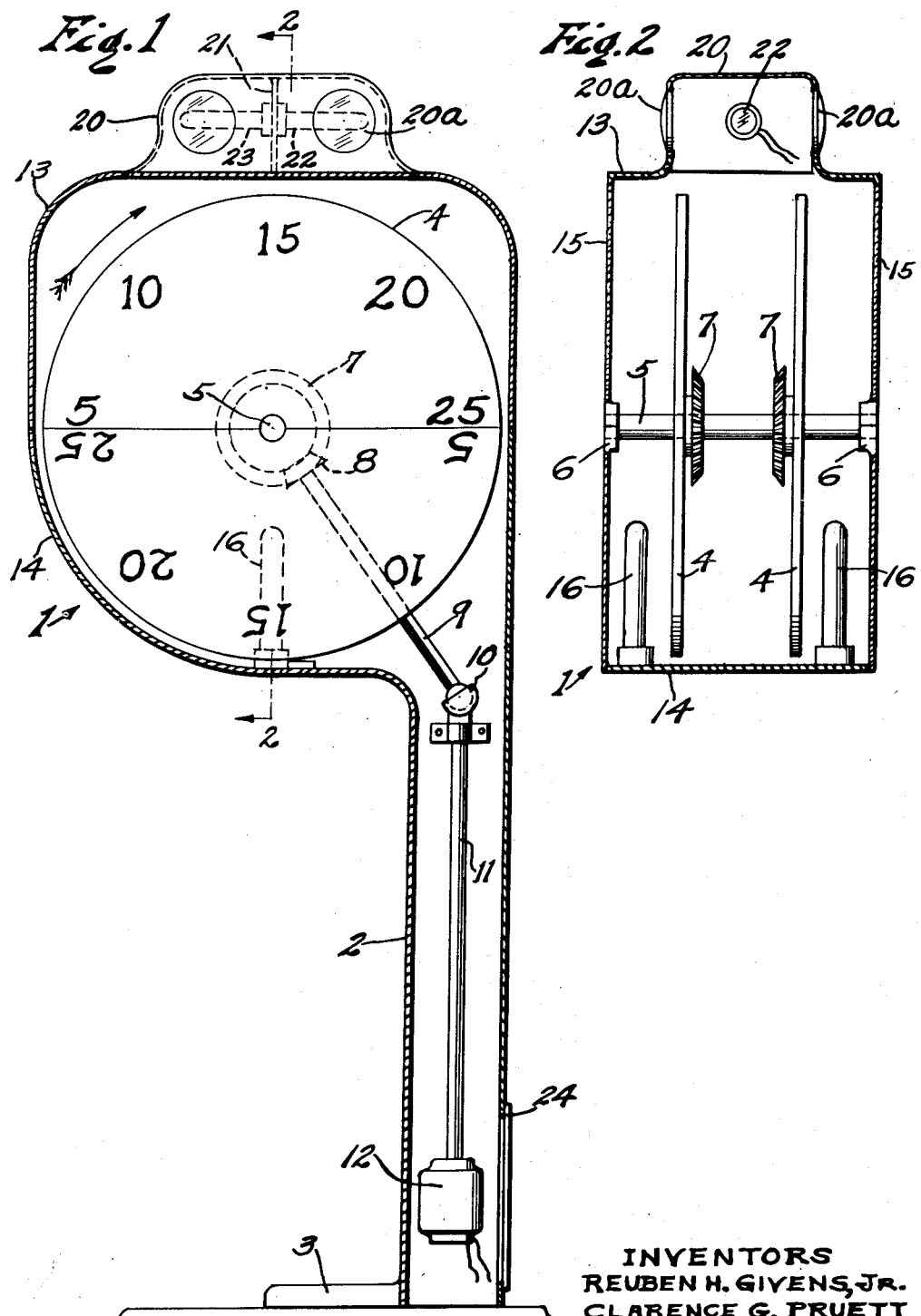
INVENTORS
REUBEN H. GIVENS, JR.
CLARENCE G. PRUETT
By John A. McDowell
Their atty.

Feb. 17, 1953 R. H. GIVENS, JR., ET AL 2,628,679
TRAFFIC SIGNAL
Filed March 17, 1947 2 SHEETS—SHEET 2
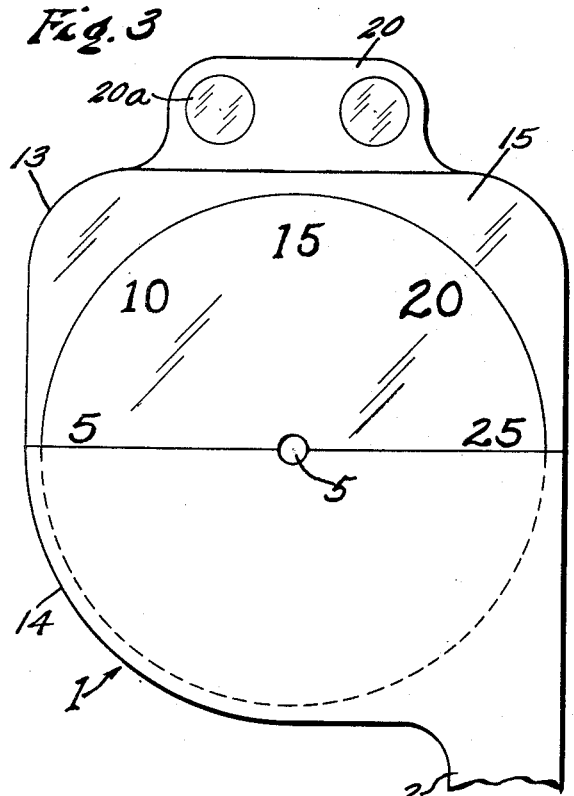
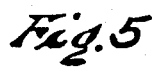
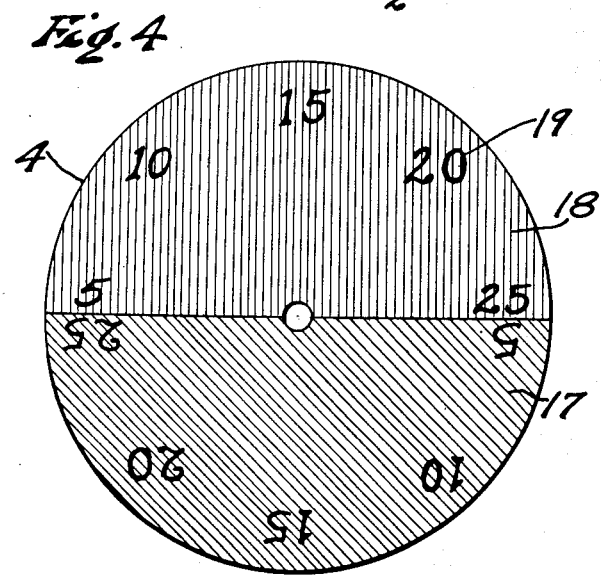
INVENTORS
REUBEN H. GIVENS, JR.
CLARENCE G. PRUETT
By John A. Mc Howell
Their atty.

Patented Feb. 17, 1953

2,628,679

UNITED STATES PATENT OFFICE 2,628,679

TRAFFIC SIGNAL

Reuben H. Givens, Jr., and Clarence G. Pruett,
Long Beach, Calif.

Application March 17, 1947, Serial No. 735,079

5 Claims. (Cl. 161—15)

This invention relates more particularly to a traffic signal and has for its principal object to provide a signal designed to be placed at the intersection of streets and highways to provide a warning to pedestrians as well to drivers of vehicles when they may cross the intersection in safety.

Another object of the invention is the novel construction and arrangement whereby when a pedestrian or driver of a vehicle approaches the intersection they will be able to tell by looking at the traffic signal how much time they will have to cross the intersection before the signal will change to indicate "stop" or "go" or vice versa.

Another object of the invention is to provide a traffic signal having a pair of disks mounted within a housing, each disk being painted on one face the colors red and green and thereon placed numerals that will indicate how much time the pedestrian or the driver of the vehicle will have before the signal will change from green to red or vice versa.

Simplicity, neatness of appearance and cheapness of manufacture are other objects of the invention.

The invention may have a variety of applications and certain of the features of construction may be embodied in a variety of structures.

Other objects, advantages and features of invention may appear from the accompanying drawings, the subjoined detailed description and the appended claims.

The accompanying drawings illustrate the invention.

Figure 1 is a front elevation of the invention partly in section to show the interior construction and a means of driving the disk. Light means are also shown.

Fig. 2 is a section on line 2—2, Fig. 1 showing the disks and gears and also shows method of illuminating the disks.

Fig. 3 is a fragmental front elevation of the signal disk showing it as may be seen through a front window and shows the lower half of the disk enclosed.

Fig. 4 is a face view of the disk showing the colors red and green and how the numerals may be applied.

Fig. 5 is an end elevation of the disk.

It is understood that the traffic signal may be made in different shapes and sizes and various parts of the invention may be constructed without departing from the spirit of the invention; but the form shown is at present deemed most desirable for easy and cheap construction and ready interchange of parts.

The invention comprises a housing 1 provided with an upright 2 having a base 3 that may be affixed in the ground on a foundation at the intersection of streets and highways as desired in the well known manner.

Enclosed in the housing 1 are the signal disks 4 that are mounted on the shaft 5 that is held in the bearings 6 of the housing and the disks are rotated on the shaft 5 through gears 7 that are in mesh with a drive gear 8 on drive shaft 9 through a ball joint 10, to an upright shaft 11 that connects to a motor 12 that will be connected to electric current by connections well known in the art.

The housing 1 at its top end is divided into a top section 13 and lower section 14 as shown in the drawings.

The top section 13 is provided with windows 15 through which the signal disks may be seen and the lower section 14 encloses the lower half of the disks 4 and supports the light bulbs 16 that light up the disks 4 so that they may be seen by a pedestrian or driver of a vehicle.

The disks 4 are colored on one face with the colors green 17, and red 18 and numerals 19 preferably black are applied thereon as shown in Figs. 1, 3 and 4 of the drawings.

The housing 1 on its top side is provided with an auxiliary signal housing 20 having lens 20a and a partition 21 that divides it into two separate compartments, one to house a red bulb 22 and the other a green bulb 23 that may be wired as desired in the usual manner.

The lower section of the upright 2 is provided with a door 24 that provides access for an electrician or operator to reach the mechanism.

Mounted in the housing 1 are light bulbs 16 that are arranged in the desired position to provide the required light at all times and are connected by a suitable source of current not shown by conventional wiring and contacts known to the art.

The numerals shown in black will indicate the proximate lapse of time until the signal changes from red to green or vice versa.

Our improved signals may be installed at intersections along a boulevard or arterial highway, so as to progressively function and thereby enable vehicles to be driven at lawful speed on the highway for a considerable distance, without stopping.

We claim:

1. In a device of the character set forth of a traffic signal comprising a pair of signal disks mounted on a shaft to revolve in a housing; each disk provided on one half of the face with the colors green and red having numerals positioned about the periphery thereof; said housing provided with an upper section having windows therein and a lower section arranged to provide a means comprising a gear mechanism to revolve said disks and a source of light to illuminate said disks so they may be seen through the windows in said upper section to direct traffic.

2. In a device of the character set forth of a traffic signal comprising a housing having an upper and lower section provided with bearings to support a shaft; disks mounted on said shaft and each disk provided on one half of the face with the colors green and red and numerals positioned about the periphery thereof and means to illuminate said disks and means comprising a gear mechanism to revolve said disks and said housing provided with means comprising windows in each side of said upper section whereby said disks may be seen by a pedestrian or driver of a vehicle.

3. A device of the character set forth of a traffic signal comprising a housing having a lower and upper section provided with windows in each side; disks rotatably mounted on a shaft inside said housing; said disks having the colors green and red on half their faces and numerals positioned about the periphery thereof; means comprising a gear mechanism to rotate said disks at a desired speed and light means located on each side of said lower section to illuminate said disk faces so they may be seen to direct traffic at an intersection.

4. A device of the character set forth of a traffic signal comprising a housing provided with an upper and lower section having an upright provided with a base that may be affixed in the ground at an intersection; said housing upper section provided with windows; a pair of signal disks rotatably mounted inside said housing; said disks having the colors green and red on their faces and numerals positioned about the periphery thereof and a source of light to illuminate said disk faces that will indicate the proximate lapse of time until the signal changes from red to green or vice versa.

5. In a device of the character set forth of a traffic signal comprising a housing having an upper and lower section; said housing provided with bearings in which is mounted a shaft; a pair of disks provided with gears on the inside face mounted on said shaft and the colors red and green on the outside face and numerals positioned about the periphery thereof; said lower section enclosing the lower half of said disks; said upper section having windows through which the upper half of said disks may be seen and gear mechanism connected to said disk gears to rotate said disks at a desired speed and light means housed in said lower section to illuminate the disk faces whereby they may be seen by traffic coming in two directions.

REUBEN H. GIVENS, Jr.
CLARENCE G. PRUETT.

REFERENCES CITED

The following references are of record in the file of this patent:

UNITED STATES PATENTS

| Number | Name | Date |
| --- | --- | --- |
| 1,784,031 | Spengeman | Dec. 9, 1930 |
| 2,317,538 | Lamar | Apr. 27, 1943 |